United States Patent [19]

Ijames et al.

[11] Patent Number: 4,815,189
[45] Date of Patent: Mar. 28, 1989

[54] METHOD OF CONVERTING A FRICTION CLUTCH ASSEMBLY

[75] Inventors: Carl E. Ijames; Kevin M. Ijames, both of Sullivan, Mo.

[73] Assignee: Ace Manufacturing and Parts Co., Sullivan, Mo.

[21] Appl. No.: 59,631

[22] Filed: Jun. 8, 1987

[51] Int. Cl.⁴ .......................... F16D 13/58; B23P 6/00
[52] U.S. Cl. ........................... 29/401.1; 192/70.13; 192/DIG. 1
[58] Field of Search .................. 192/70.13, 70.19, 70.3, 192/112, 113 A, DIG. 1; 29/401.1

[56] References Cited

U.S. PATENT DOCUMENTS

| | | | |
|---|---|---|---|
| 1,767,309 | 6/1930 | Ricardo | 192/113 A |
| 2,090,265 | 8/1937 | Padgett | 192/70.13 |
| 3,334,716 | 8/1967 | Spokas | 192/70.3 X |
| 3,981,381 | 9/1976 | Nosek | 192/70.13 X |
| 4,057,131 | 11/1977 | Flotow | 192/70.13 |
| 4,069,905 | 1/1978 | DeGennes | 192/112 |
| 4,540,079 | 9/1985 | Link | 192/70.13 X |
| 4,611,702 | 9/1986 | Kayakabe et al. | 192/110 R |

*Primary Examiner*—Leslie A. Braun
*Assistant Examiner*—Richard M. Lorence
*Attorney, Agent, or Firm*—Senniger, Powers, Leavitt and Roedel

[57] ABSTRACT

A method of converting from a first clutch of the type comprising a relatively wide-profile cover having an integral circular rim attached to one face of a flat rimless flywheel, to a second clutch of the type comprising a relatively thin-profile cover. The method comprises detaching the first clutch with the wide-profile cover from the flywheel, applying the second clutch including the thin-profile cover and an adaptor ring to one face of the flywheel with the adaptor ring disposed between the cover and the flywheel, and removably attaching the cover and adaptor ring to the flywheel.

3 Claims, 3 Drawing Sheets

METHOD OF CONVERTING A FRICTION CLUTCH ASSEMBLY

BACKGROUND OF THE INVENTION

This invention relates generally to clutches and, more particularly, to clutch assemblies for trucks adapted for use with flat flywheels (as opposed to flywheels with peripheral rims).

Clutch assemblies of the type shown in U.S. Pat. No. 3,394,788 are designed for use with rimmed flywheels and comprise a heavy-duty cast metal clutch cover which is adapted to be secured (e.g., bolted) directly to the rim of the flywheel. The cover has a relatively narrow or thin profile (i.e., the axial dimension of the cover is substantially less than the overall axial dimension of the clutch), the axial dimension of the rim of the flywheel being sufficient to accommodate the friction disk assembly and pressure plate assembly generally within the rim. This type of clutch has proven to be relatively durable. Clutches designed for use with rimless (i.e., flat) flywheels have also been developed. This latter type of clutch comprises a lightweight clutch cover of stamped metal which is adapted to be secured at its periphery directly to the flat face of the flywheel. The cover has a relatively wide profile (that is, its axial dimension is relatively large) to accommodate the inner workings of the clutch, including the friction disk and pressure plate assemblies. Unlike the cast metal thin-profile cover clutch, this latter clutch design has not been a substantially durable one, due in significant part to the deficiencies in the relatively lightweight stamped-metal clutch cover.

Accordingly, there is a need in the clutch industry (especially in the clutch rebuilding industry) to replace the wide-profile cover with the prior heavy-duty thin-profile cover with modifications enabling use of the heavy-duty cover with flat rimless flywheels.

SUMMARY OF THE INVENTION

Among the several objects of this invention may be noted the provision of a clutch assembly which is adapted for use with rimless flywheels but which incorporates the aforesaid heavy-duty thin-profile cover for greater durability and a longer clutch life; the provision of such a clutch assembly which comprises an adaptor ring specially constructed to enable usage of a thin-profile cover with a rimless flywheel; the provision of such an adaptor which is relatively simple in construction for economic manufacture; the provision of such an adaptor ring which is easy to install and readily capable of being balanced for smooth rotation of the clutch assembly; the provision of such an adaptor ring which is adapted for use in a clutch having either a single set of friction disks or a double set of friction disks; and the provision of a method of converting from a clutch of the type incorporating a relatively wide-profile cover attached to a rimless flywheel, to a clutch of the type comprising a relatively thin-profile cover for use with the rimless flywheel.

Generally, a clutch assembly of this invention is adapted for attachment to a flat rimless flywheel rotatable on an axis. The assembly comprises an adaptor ring, fastener means for removably attaching the adaptor ring to one face of the flywheel with the adaptor ring generally coaxial with the flywheel, a relatively thin-profile cover spaced axially from said one face of the flywheel, said cover being adapted for attachment at its periphery to the adaptor ring for conjoint rotation on said axis with the adaptor ring and the flywheel, a friction disk assembly disposed inside the adaptor ring axially between the cover and he flywheel adapted for connection to a shaft for rotating the shaft on said axis, a pressure plate assembly disposed inside the adaptor ring axially between the friction disk assembly and the cover movable axially relative to the cover and the flywheel for pressing the friction disk assembly against the flywheel thereby to effect rotation of the disk assembly and said shaft on said axis, the axial dimension of said adaptor ring being sufficient to at least substantially accommodate the axial dimension of the friction disk assembly and said pressure plate assembly.

A second aspect of this invention involves an adaptor ring for use in connecting a relatively thin-profile clutch cover of a clutch assembly to a flat rimless flywheel for conjoint rotation of the cover and the flywheel on an axis. The adaptor ring is adapted to be placed in an operative position in which it is interposed between the periphery of the clutch cover and one face of the flywheel with the adaptor ring generally coaxial with the flywheel and the cover. Fastener means is provided for removably attaching the cover to the adaptor ring and the adaptor ring to said one face of the flywheel in the stated operative position, the axial dimension of the adaptor ring being sufficient to accommodate inner workings of the clutch including a friction disk assembly and a pressure plate assembly.

Also disclosed is a method of converting from a first clutch of the type comprising a relatively wide-profile cover having an integral circular rim attached to one face of a flat rimless flywheel for conjoint rotation of the cover with the flywheel about an axis, said wide-profile cover having an axial dimension sufficient to house various component parts of the clutch including a friction disk assembly disposed axially between the cover and the flywheel adapted for connection to a shaft for rotating the shaft on said axis and a pressure plate assembly disposed axially between the friction disk assembly and the cover movable axially relative to the cover for pressing the friction disk assembly against the flywheel thereby to effect rotation of said disk assembly and said shaft on said axis, to a second clutch of the type comprising a relatively thin-profile cover having an axial dimension insufficient to house said various component parts thereof. The method comprises detaching said first clutch with said wide-profile cover from the flywheel, applying said second clutch including said thin-profile cover and an adaptor ring to one face of the flywheel with the adaptor ring disposed between the cover and the flywheel and generally coaxial with the cover and the flywheel, the arrangement being such that the thin-profile cover is spaced axially from the flywheel by the axial dimension of the adaptor ring, said axial dimension being sufficient to accommodate said various component parts of the clutch, and removably attaching the cover and adaptor ring to the flywheel for conjoint rotation on said axis.

Other objects and features of this invention will be in part apparent and in part pointed out hereinafter.

Figure 1:
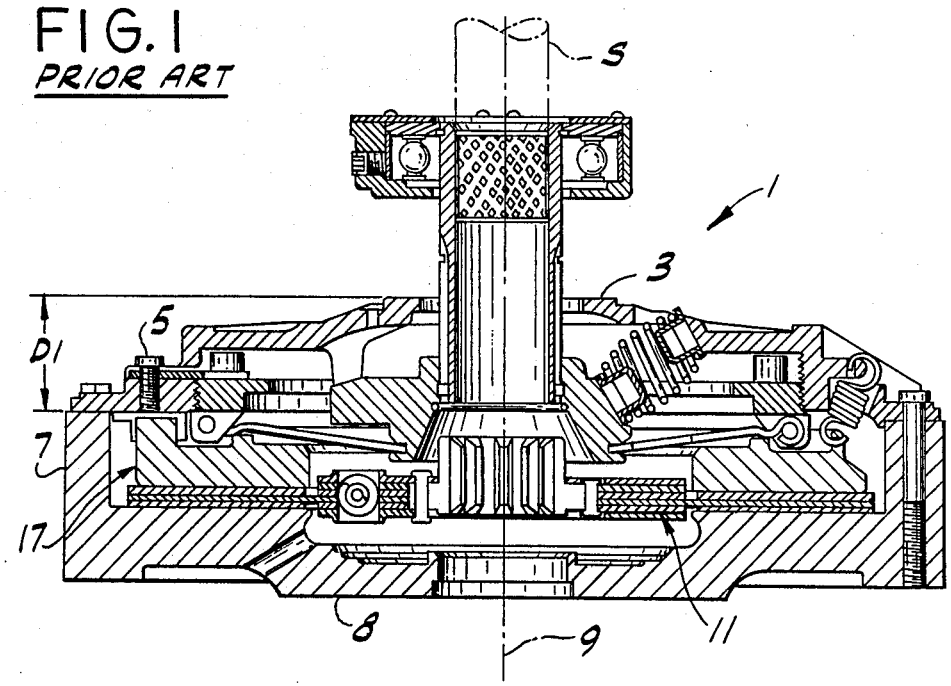
FIG. 1 is a cross-sectional view of a prior art clutch assembly of the type wherein a thin-profile cover is attached directly to the rim of a flywheel.

Correspoding reference characters indicate corresponding view throughout the several views of the drawings.

DESCRIPTION OF THE PREFERRED EMBODIMENT

Referring now t the drawings, and first more particularly to FIG. 1, there is generally indicated at 1 a prior art clutch of the type comprising a cover 3 attached by means of bolts 5 to the rim 7 of a flywheel 8 for conjoint rotation of the cover and the flywheel about an axis 9. As illustrated, the cover has a relative thin profile, that is, the axial dimension D1 of the cover is substantially less than the overall axial dimension of the clutch. The clutch is of conventional construction, comprising a friction disk assembly generally designated 11 disposed inside the rim 7 of the flywheel between the cover 3 and the flywheel and a pressure plate assembly generally designated 17 disposed inside the rim between the cover and the friction disk assembly, the pressure plate assembly being movable axially forward relative to the cover (when the clutch pedal is released) for pressing the friction disk assembly 11 against the flywheel thereby to effect rotation of the disk assembly and a drive shafts to which it is splined. The cover 3 is of heavy-duty construction (e.g., cast metal construction).

For a detailed description of the clutch shown in FIG. 1, reference may be made to U.S. Pat. No. 3,394,788, which is incorporated herein by reference.

Figure 2:
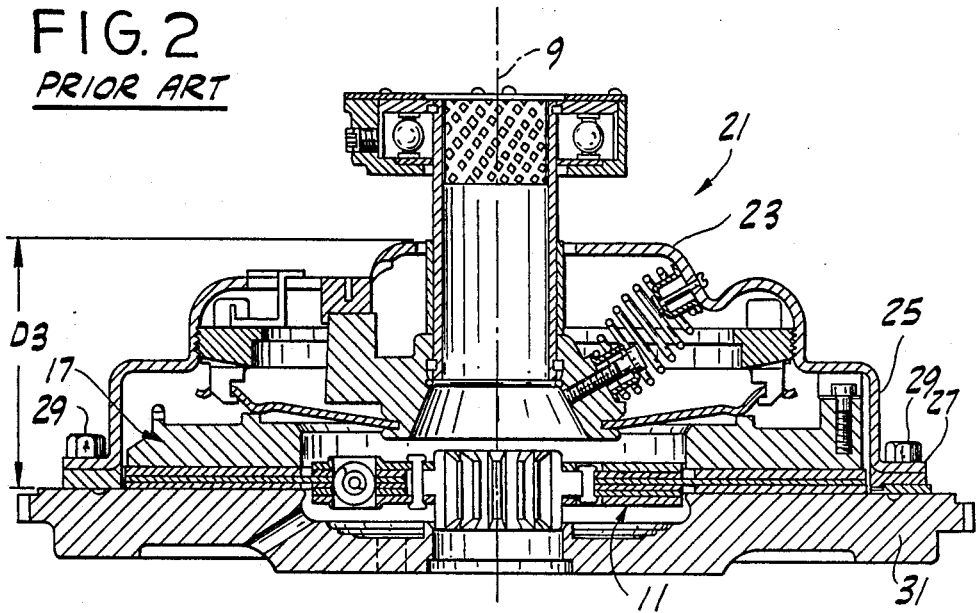
FIG. 2 is a cross-sectional view of a prior art clutch assembly of the type wherein a wide-profile cover is attached directly to one face of a flat (rimless) flywheel.

Referring now to FIG. 2, another prior art clutch is designated in its entirety by the reference numeral 21. This clutch is generally similar to the clutch 1 of FIG. 1 and corresponding parts are indicated by the same reference nemerals. However, clutch 21 differs from clutch 1 in that it comprises a relatively wide-profile cover 23 having a relatively deep axially-extending circular rim 25 and a peripheral flange 27 extending radially outwardly from the rim for attachment of the cover by means of bolts 29 to one face of a flywheel 31, which in this instance is rimless (i.e., flat). The cover 23 is of relatively lightweight construction (e.g., a stamped metal part) and, as noted, has a wide profile, the axial dimension D3 of the cover being sufficient to accommodate the inner workings of the clutch assembly, including the friction disk assembly 11 and the pressure plate assembly 17. As discussed herein above, this type of clutch has not proven to be durable and must be rebuilt frequently. This is due at least in part to the construction of the cover 23.

Figure 3:
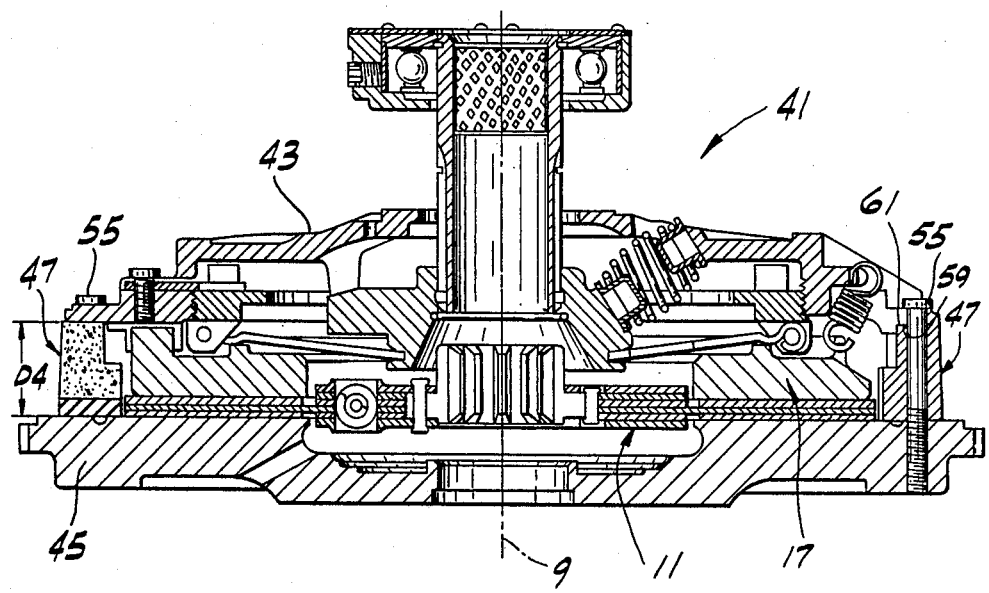
FIG. 3 is cross-sectional view of a clutch assembly incorporating an adaptor ring of this invention.

A clutch assembly incorporating the present invention is shown in FIG. 3 and designated generally by the numeral 41. As illustrated, the cover 43 of this assembly is identical to the thin-profile cover 3 of the clutch 1 shown in FIG. 1, but the assembly is adapted for attachment to a flat rimless flywheel 45 of the type shown in FIG. 2. The use of this thin-profile cover in conjunction with a rimless flywheel is enabled by an adaptor ring generally indicated at 47 interposed between the periphery of the cover 43 and the flywheel. The adaptor ring has an outer diameter approximately equal to that of the flywheel and an axial dimension D4 sufficient to at least substantially accommodate or contain the friction disk and pressure plate assemblies 11, 17.

The adaptor ring 47 has first (front) and second (rear) end faces designated 51 and 53 extending generally radially with respect to the central axis 9 of the ring. The cover 43 is removably attached to the rear end face 51 of the ring and the ring is removably attached to the fly-wheel with the front end face 53 of the ring in face-to-face contact with the flywheel by fastening means comprising a plurality of bolts 55 (e.g., twelve bolts) extending axially through holes in the cover, through bores 57 in the adaptor ring and thence threadably into the flywheel 45 at spaced intervals around the flywheel. The adaptor ring has internal shoulder means comprising a series of relatively short arcuate shoulders 59 concentrically arranged around the ring on the inside of the ring and lying in a radial plane spaced relatively closely to the radial plane of the rear end face 51 of the ring. These internal shoulders 59 are adapted to mate face-to-face with an external shoulder 61 on the cover 43 for positioning the cover coaxially with respect to the ring. 4

Figure 4:
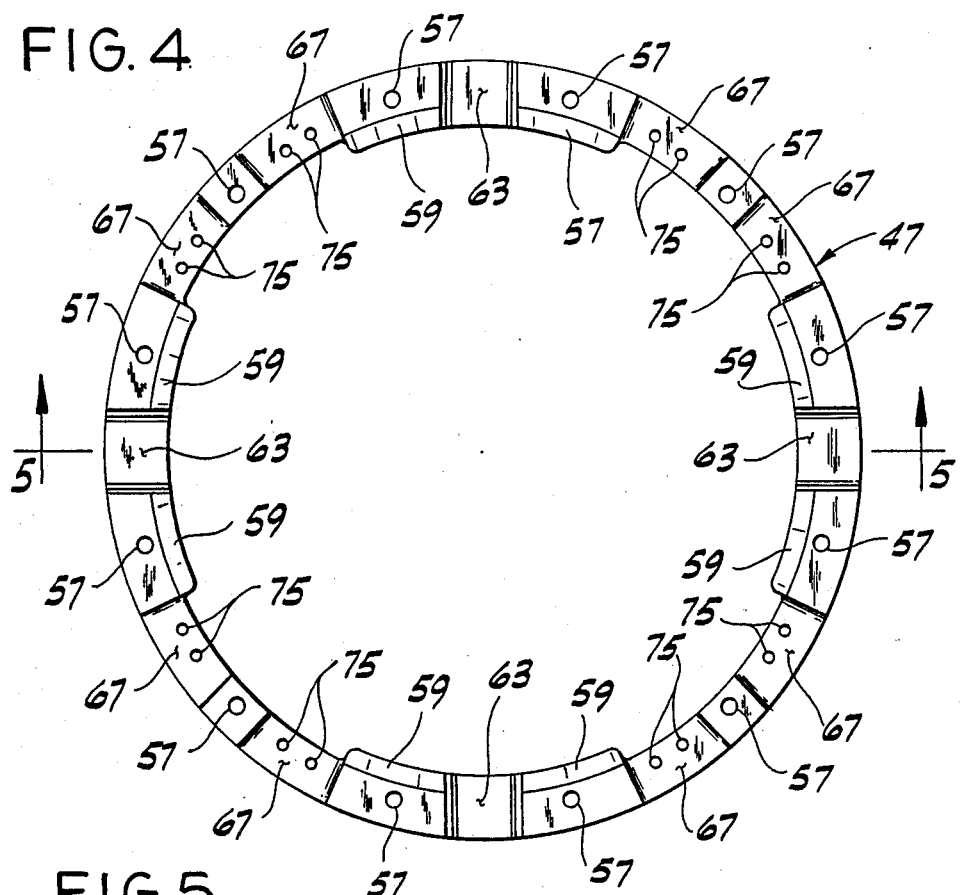
FIG. 4 is a plan view of the adaptor ring.
Figure 5:
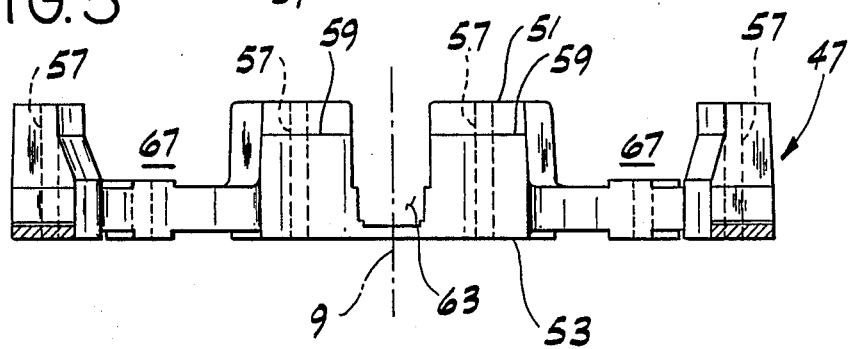
FIG. 5 is a side elevation of the adaptor ring.

As best illustrated in FIGS. 4 and 5, the adaptor ring 47 has a series of notches 63 therein (four such notches being illustrated) spaced at equal intervals (e.g., 90° intervals) around the ring and extending from the rear end face 51 of the ring toward the front end face 53. In the design of FIG. 3, wherein the friction disk assembly 11 comprises only one set of friction disks, these notches serve only to reduce the weight of the adaptor ring and to provide for ventilation. Additional openings in the form of relatively wide notches indicated at 67 are also provided in the adaptor ring at spaced intervals around the ring to further reduce the overall weight of the ring and to provide for additional ventilation. The adaptor ring is preferably of cast metal, such as ductile cast iron having a tensile strength of 75,000 psi. The wall thickness of the ring tapers gradually from the front end face 53 to the rear end face 51.

Spaced at intervals around the adaptor ring 47 at the forward ends of the notches 67 is a plurality of pairs of shallow depressions 75 for indicating whereto remove material from the ring as may be necessary to provide for balanced rotation of the ring and clutch assembly on axis 9. Thus, if balancing is necessary, this may be accomplished by drilling holes at one or more locations identified by the depressions 75.

Figure 6:
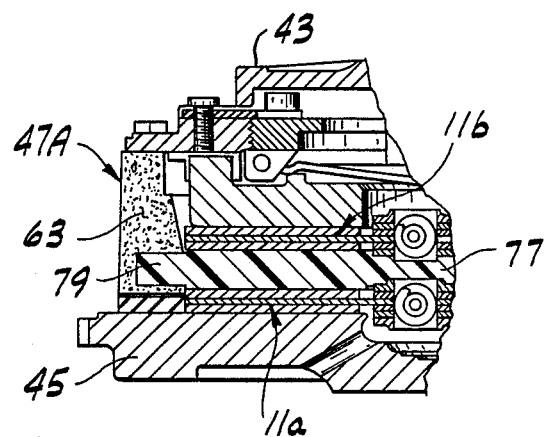
FIG. 6 is a partial cross-sectional view illustrating the use of the adaptor ring with two sets of frition disks and an intermediate plate therebetween.

Referring now to FIG. 6, an adaptor ring 47A of the present invention is illustrated in use with a clutch assembly comprising two sets 11a and 11b of friction disks and an intermediate plate 77 therebetween. The ring is essentially identical to ring 47 (and correponding parts are identified by corresponding reference numerals), the only significant difference being that its axial dimension is greater to accommodate the additional set of friction disks and intermediate plate 77. With this type of clutch, notches 63 in the adaptor ring are adapted to receive radial lugs 79 on the intermediate plate 77 to provide for conjoint rotation of the intermediate plate with the adaptor ring 47A, cover 43 and flywheel 45. The notches 63 are sized at their forward ends for a relatively close fit of the lugs 79 therein to prevent substantial relative movement between the intermediate plate 77 and the adaptor ring.

In accordance with the method of this invention, it is possible to readily convert from a clutch of the type shown in FIG. 2 utilizing a relatively lightweight wide-profile cover 23, to a clutch of the type shown in FIG. 3 utilizing a more heavy-duty thin-profile cover 43. Such conversion is most likely to be effected when the clutch of FIG. 2 is in need of repair. The method simply involves detaching the clutch shown in FIG. 2 from the flywheel 31 by removing bolts 29, and replacing it with a new (or rebuilt) clutch of the type shown in FIG. 3. Such replacement is effected by applying the FIG. 3 clutch assembly to the flywheel 45 with the adaptor ring 47 or 47A disposed between the cover 43 and the flywheel 45 and generally coaxial with both. The clutch assembly (including the adaptor ring) is then attached to the flywheel by inserting bolts 55 through holes in the cover 43, bores 57 in the adaptor ring 47 or 47A and thence threadably into the flywheel.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of converting a first clutch comprising a relatively wide-profile cover having an integral circular rim attached to one face of a flat rimless flywheel for conjoint rotation of the cover with the flywheel about an axis, said wide-profile cover having an axial dimension sufficient to house the various component parts of the clutch including a friction disk assembly disposed axially between the cover and the flywheel adapted for connection to a shaft for rotating the shaft on said axis and a pressure plate assembly disposed axially between the friction disk assembly and the cover movable axially relative to the cover for pressing the friction disk assembly against the flywheel thereby to effect rotation of said disk assembly and said shaft on said axis, to a second clutch comprising a relatively thin-profile cover, said method comprising:

detaching said first clutch with said wide-profile cover from the flywheel;

applying said second clutch including said thin-profile cover and an adaptor ring to one face of the flywheel with the adaptor ring disposed between the cover and the flywheel and generally coaxial with the cover and the flywheel, the arrangement being such that the thin-profile cover is spaced axially from the flywheel by the axial dimension of the adaptor ring, said axial dimension of the adaptor ring being sufficient to accommodate said various component parts of the clutch; and removably attaching the cover and adaptor ring to the flywheel for conjoint rotation on said axis.

2. A method as set forth in claim 1 wherein said adaptor ring has a plurality of notches therein extending axially from one end face of the ring toward the other end face of the ring, said method further comprising placing radially extending lugs of an intermediate plate of the friction disk assembly into said slots during assembly of the clutch to provide for conjoint rotation of the intermediate plate and adaptor ring.

3. A method as set forth in claim 1 further comprising drilling one or more axial holes in the adaptor ring for balanced rotation of the ring on said axis.

* * * * *